Feb. 11, 1964 J. R. BURNS ETAL 3,121,176

SHIFT REGISTER INCLUDING BISTABLE CIRCUIT FOR STATIC STORAGE AND TUNNEL DIODE MONOSTABLE CIRCUIT FOR DELAY

Filed Oct. 10, 1961 3 Sheets-Sheet 1

INVENTORS,
JOSEPH R. BURNS &
JUAN J. AMODEI
BY John V. Regan
ATTORNEY

INVENTORS.,
JOSEPH R. BURNS &
JUAN J. AMODEI
BY John V. Regan
Attorney

INVENTORS.
JOSEPH R. BURNS &
JUAN J. AMODEI
BY John V. Regan
ATTORNEY

United States Patent Office 3,121,176
Patented Feb. 11, 1964

3,121,176

SHIFT REGISTER INCLUDING BISTABLE CIRCUIT FOR STATIC STORAGE AND TUNNEL DIODE MONOSTABLE CIRCUIT FOR DELAY

Joseph R. Burns, Trenton, N.J., and Juan J. Amodei, Levittown, Pa., assignors to Radio Corporation of America, a corporation of Delaware Filed Oct. 10, 1961, Ser. No. 144,186
15 Claims. (Cl. 307—88.5)

This invention relates to shifting circuits and, in particular, to improved shift registers which employ transistors and negative resistance diodes.

A binary shift register may be defined generally as a device having a number of cascaded, binary storage stages for receiving and delivering a like number of binary bits, on command, either serially in ordered sequence or in parallel. Shift registers are widely used, for example, in performing various arithmetical operations and in performing serial-to-parallel conversion and vice versa. Such devices also may be used as ring counters with slight modification. When it is desired to shift the information stored in a binary shift register one bit position to the left or right, one or more control pulses, depending upon the type of register, are applied to each stage, with the result that a signal indicative of the state of each stage is applied to the next stage on the left or right, respectively, for switching that next stage to the same state.

A problem often encountered in shift registers is the drop-out or loss of information bits during the shift operation. By way of example, a stage may respond to the incoming signal from the stage on the left and be switched before a satisfactory signal is sent to the stage on the right. This problem is obviated in some registers by providing interim storage devices or delay means between the various stages. The particular delay means employed, however, may have an important effect on the operating speed of the register. Other schemes such as a programmed sequence of shift pulses for each shift also are known. In general, it is desirable that the shift register be one which has a minimum number of components, which requires a single shift pulse for shifting information, and in which the components of the individual stages operate at high speed both in response and recovery time.

A shift register having these desirable features is provided according to the invention, wherein each stage preferably includes a tunnel diode-transistor bistable circuit for static storage and a tunnel diode monostable circuit for dynamic storage or delay. Advantage is taken of the high speed switching and controlled threshold properties of the tunnel diodes and the amplifying and isolating properties of the transistor. The parameters of the circuits are selected so that the slowest transistor turns off during the duration of the single shift pulse, and the pulse output of each triggered monostable circuit overlaps the trailing edge of the shift pulse in point of time.

It is a feature of the invention that only one transistor is employed per stage, with accompanying reduction in the number of components and power dissipation.

It is another feature of the invention that the control or shift pulse applied to the register operates to turn off the transistors, permitting a hard turn-off overdrive with accompanying reduced turn-off delay.

According to another feature of the invention, low peak current tunnel diodes may be used in the bistable circuits and high peak current diodes may be used in the monostable circuits. The relatively large pulse output from a monostable circuit not only rapidly switches the tunnel diode in the next cascaded bistable circuit, but also provides turn-on overdrive for the transistor in that bistable circuit.

In the accompanying drawing, like reference characters denote like components, and:

Figure 3:
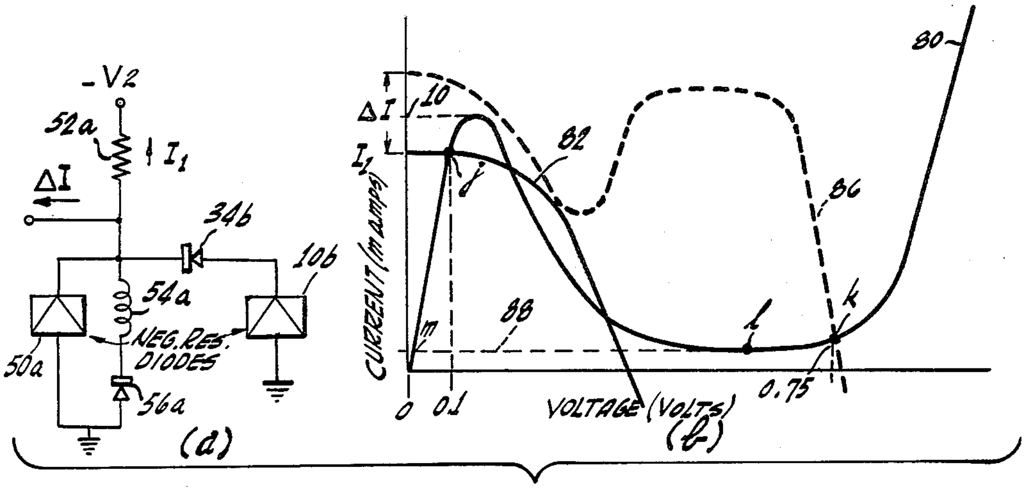
Figure 4:
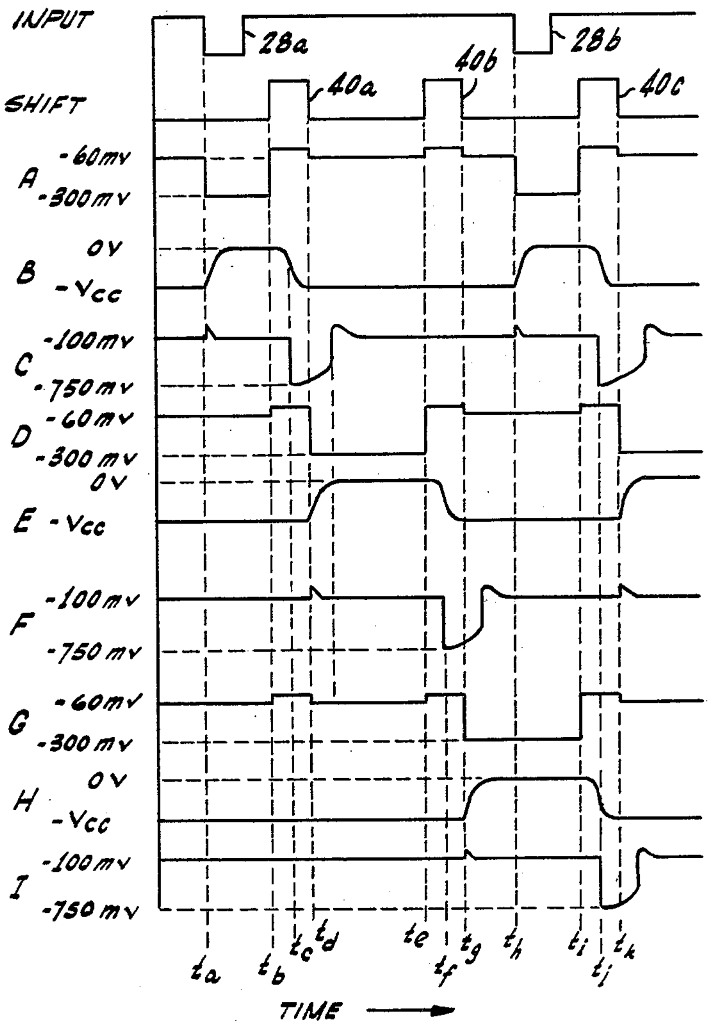

FIGURE 3*a* is a schematic diagram of the monostable circuit portion of a shift register;

FIGURE 3*b* is a volt-ampere characteristic useful in explaining the operation of the monostable circuit;

FIGURE 4 is a timing diagram for the shift register; and

Figure 5:
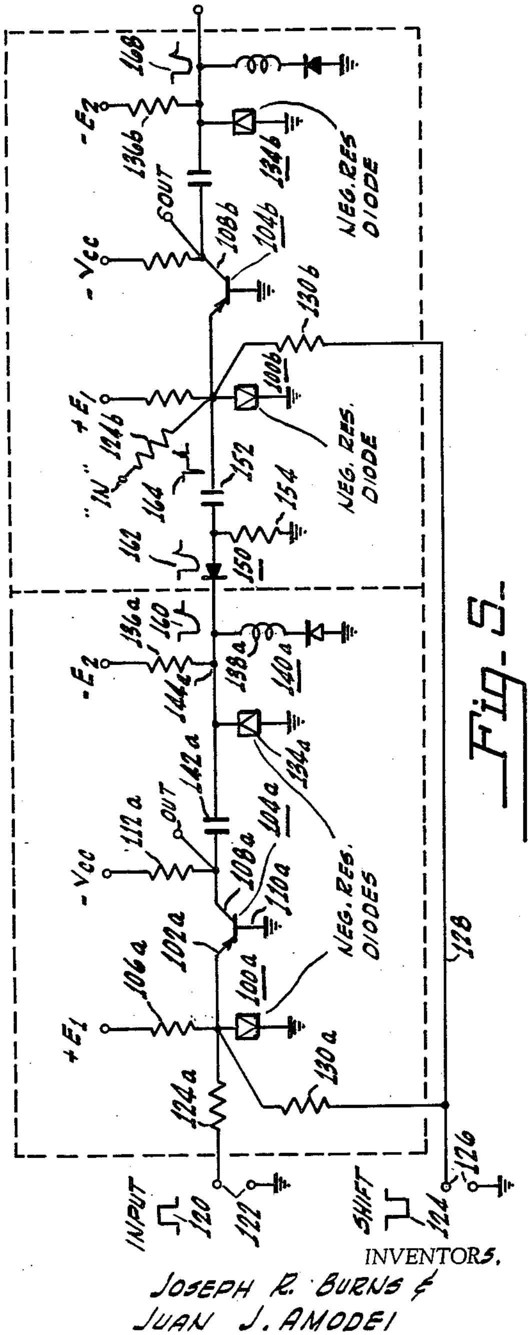

FIGURE 5 is a schematic digram of another embodiment of an improved shift register according to the invention.

Figure 1:
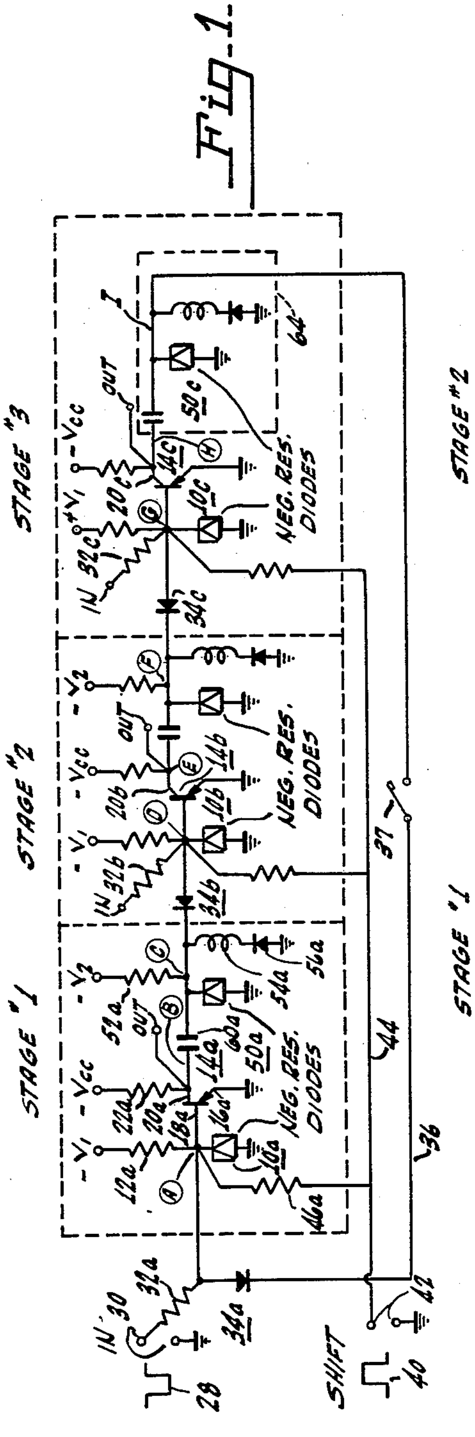
FIGURE 1 is a schematic diagram of one form of improved shift register according to the invention.

One embodiment of a shift register according to the invention is illustrated schematically in FIGURE 1. Only three stages are given by way of example. It will be understood, however, that the register may be expanded to any number of stages by cascading additional stages of the type illustrated and to be described. In general, each of the three stages is similar and, accordingly, only the first stage will be described in detail, except as may be necessary to point out differences between the various stages. Like components in the different stages are designated by like reference numerals followed by the subscript *a*, *b* or *c* corresponding to the stages 1, 2 and 3, respectively.

The first stage, as viewed on the left of the drawing, includes a bistable circuit portion and a monostable circuit portion. The bistable portion comprises a negative resistance diode 10*a* serially connected with a resistor 12*a* between a point of reference potential, illustrated by the conventional symbol for circuit ground, and a source of bias potential, designated $-V_1$. This bias source and all other bias sources to be described may be batteries (not shown). In particular, the $-V_1$ source may be a battery having its negative terminal connected to the upper end of the resistor 12*a* and having its positive terminal connected to reference ground. The negative resistance diode 10*a* may be characterized as one having a volt-ampere characteristic with two regions of positive resistance separated by a region of negative resistance. A preferred type of negative resistance diode for use in practicing the invention is one known as a tunnel diode. Tunnel diodes and their operating characteristics are described in the literature, for example in an article by H. S. Sommers, Jr., in the Proceedings of the IRE, July 1959, at page 1201, and in other publications. The diode 10*a* is connected in the circuit so as to be forward biased in response to current flowing through the diode 10*a* and resistor 12*a* to the $-V_1$ bias source. As will be described more fully hereinafter in connection with FIGURE 2, the values of the bias source voltage and the resistance of the resistor 12*a* are selected to supply a substantially constant current to the ungrounded electrode of the tunnel diode 10*a*. In FIGURE 1, the cathode is the ungrounded electrode.

The bistable portion also includes a transistor 14*a* which has its emitter, or common, electrode 16*a* conneted to reference ground and its base, or input electrode 18*a* connected to the cathode of the tunnel diode 10*a*. The collector, or output, electrode 20*a* is biased in the reverse direction relative to the base 18*a* by connecting the collector 20*a* through a resistor 22*a* to a source of bias potential designated $-V_{cc}$. Negative input pulses 28 may be supplied to the bistable circuit at a pair of input terminals 30, one of which is connected to reference ground and the other of which is connected through a resistor 32*a* to the cathode of the tunnel diode 10*a*. When the shift register is operated as a ring counter, an input signal also may be applied through a diode 34*a* over a line 36 from the output of the last stage, stage 3 in this case. A normally-opened switch 37 is connected in series in the line 36. Switch 37 is closed when the circuit is operated as a ring counter. It is understood that an electronic switch may be used for switch 37. The input pulses 28 have an amplitude and polarity to set or switch the tunnel diode 10*a* from a first to a second stable state. The tunnel diode 10*a* may be reset to the first stable state by applying positive shift pulses 40 at a pair of shift input terminals 42. One of the latter pair of terminals 42 is connected to reference ground and the other of the terminals 42 is connected to a common shift line 44. The shift pulses 40 are applied to the tunnel diode 10*a* from the shift line 44 by way of a decoupling resistor 46*a*.

The monostable circuit portion of the first stage comprises a second tunnel diode 50*a* connected in series with a resistor 52*a* between reference ground and a source of bias potential, designated $-V_2$. The series combination of an inductor 54*a* and a conventional diode 56*a* is connected in parallel with the second tunnel diode 50*a*. The tunnel diode 50*a* and the conventional diode 56*a* both are poled with their direction of easy current flow in the same direction, namely, in a direction to pass current, in the conventional sense, flowing from ground. A coupling capacitor 60*a* is connected between the collector electrode 20*a* of the transistor 14*a* and the ungrounded electrode of the tunnel diode 50*a*, the cathode in this case, which may be considered the trigger input terminal of the monostable circuit.

The bistable circuit portion of each stage is designed to store information until a shift pulse 40 is applied to the register. The monostable circuit portion provides dynamic storage or interim storage or delay for the information to be transferred between stages when a shift pulse 40 is applied. The monostable circuit prevents the loss of information bits during the shift cycle in a manner to be described. A monostable circuit branch is unnecessary at the output of the last, or third, stage when the register is used only as a shift register. For this reason, the monostable circuit in the third stage is shown within a dashed box 64. However, this monostable circuit is a necessary part of the register when the register is operated as a ring counter, and provides interim storage of the signal supplied from the third stage to the first stage in the latter case.

Information may be entered serially into the register by applying the information bits 28 serially at the input terminals 30 in timed sequence with the application of the shift pulses 40. Information may be read out of the register serially at the output terminal, designated "out," connected at the collector electrode 20*c* in the third stage. Alternatively, information read into the register serially may be read out in parallel at the output terminals designated "out" at each of the collector electrodes 20*a*, 20*b* and 20*c*. Information also may be read into the register in parallel by applying input signals at the input terminals 30 and at other input terminals designated "in," the latter terminals being connected through resistors 32*b* and 32*c* to the cathodes of the tunnel diodes 10*b* and 10*c*, respectively. As is known, only one stage of the register may store a binary "1" when the register is operated as a ring counter, and information then is not entered into the register from an outside source, except as may be necessary to enter the initial "1" into the register.

Figure 2:
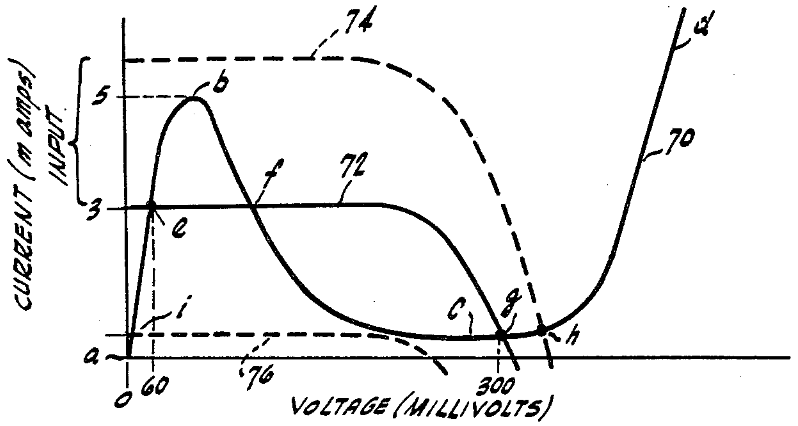
FIGURE 2 is a volt-ampere characteristic useful in explaining the operation of the bistable circuit portion of a shift register stage.

Operation of the bistable circuit portion of a stage may best be understood by reference to FIGURE 2. In FIGURE 2, curve 70 is the volt-ampere characteristic of a tunnel diode 10*a*, 10*b* or 10*c*. The curve has a first region *ab* of positive resistance and a second region *cd* of positive resistance separated by a region *bc* of negative resistance. The bias source $-V_1$ and the resistor 12*a* parameters, for example, are chosen so that a substantially constant current of approximately 3 milliamperes is supplied at the cathode of the tunnel diode 10*a* when the tunnel diode 10*a* is one having a peak current of approximately 5 milliamperes. The transistor 14*a* acts as a load on the tunnel diode 10*a*. The curve 72 in FIGURE 2 represents the load on the tunnel diode looking into the base 18*a* of the transistor 14*a* under static conditions. This curve 72 intersects the volt-ampere characteristic 70 at points *e*, *f* and *g*. The points *e* and *g* are intersections with the curve 70 in regions of positive resistance and stable operating points. The point *f* of intersections in the negative resistance region represents an unstable operating condition. It should be noted that the voltage values given in FIGURE 2 and corresponding to points *e* and *g* represent the voltages across the tunnel diode 10*a* for the two stable operating states. Because the anode of the tunnel diode is grounded, the voltage at the cathode is negative with respect to ground by an amount determined by the intersection at the abscissa of a vertical line through the operating point on the characteristic 70.

Assume initially that the operating condition for the bistable circuit is represented by the point *e*. The voltage across the tunnel diode 10*a* then is approximately 60 millivolts and the voltage at the base electrode 18 is 60 millivolts negative with respect to the emitter 16*a*. As may be seen in FIGURE 2, the transistor 14*a* then is in the substantially nonconducting or cut-off condition and all of the 3 milliampere input current flows through the tunnel diode 10*a*. Applying a negative current pulse 28 at the input terminals 30 has the effect of raising the load line in a vertical direction, for example, to a position indicated by the dashed curve 74. It will be noted that the curve 74 has only one point *h* of intersection with the characteristic 70. The current through the tunnel diode 10*a* increases rapidly as the operating point of the tunnel diode 10*a* moves along the portion *eb* of the characteristic curve 70 in response to the applied input pulse. When the point *b* is reached, the tunnel diode 10*a* switches rapidly through its negative resistance region to the high voltage state at point *h*. Upon termination of the current pulse 28, the current through the tunnel diode 10*a* decreases slightly as the operating point moves from the point *h* to the point *g*, at the intersection of the static load line 72 and the diode characteristic 70. The circuit stabilizes at the point *g*. The voltage across the tunnel diode 10*a* then is high, approximately 300 millivolts, and the transistor 14*a* is biased into heavy conduction. In fact, as may be seen in FIGURE 2, the transistor 14*a* is in substantial saturation with a base 18*a* current of slightly less than 3 milliamperes. The base 18*a* current at any time is the difference between the current supplied at point A (FIGURE 1) and that flowing through the tunnel diode 10*a*. Accordingly, it may be seen that a large turn-on overdrive current is supplied to the base 18*a* when the input pulse 28 is applied.

The bistable circuit remains in the high voltage state until a shift pulse 40 is applied at the terminals 42. The shift pulse 40 supplies a current of the opposite polarity to the input pulse 28 at the cathode of the tunnel diode 10*a* and has the effect of shifting the load line in a downward direction, for example to the position indicated by the dashed curve 76. This curve 76 intersects the characteristic curve 70 only at point *i* in the low voltage region. Accordingly, the tunnel diode switches rapidly through the negative resistance region to the point *i* when the tunnel diode current is decreased below a value corresponding to the transition point *c*. The transistor 14*a* then is reverse biased. Current through the tunnel diode 10*a* again increases to approximately 3 milliamperes (point *e* of the curves 70 and 72) at the termination of the shift pulse 40. The speed of switching of the tunnel diode from the low voltage to the high voltage state and vice versa is dependent upon the amplitude of the current pulses producing the switching action. That is to say, a large input current pulse 28 produces faster switching than a small amplitude input pulse. Moreover, the amplitude of the input pulse 28 has an effect upon the turn-on time of the transistor 14a, as described above. For these reasons, it is preferable to select the amplitude of the input pulse 28 to provide optimum switching time of the tunnel diode 10a and turn-on time of the transistor 14a. In like manner, the amplitude of the shift pulse 40 has an effect upon the time it takes the tunnel diode 10a to switch from the high voltage state (point *g*) to the low voltage state (point *i*) and also has an effect upon the transistor turn-off time. The amplitude of the shift pulse 40, therefore, preferably is chosen to provide fast switching of the tunnel diode 10a and a high turn-off overdrive for the transistor 14a to enhance the operating speed of the stage.

Consider now the operation of the monostable circuit portion. The monostable circuit is illustrated in FIGURE 3a adjacent to the volt-ampere characteristic of FIGURE 3b defining the operation of the circuit. The solid curve 80 of FIGURE 3b is the volt-ampere characteristic of the tunnel diode 50a. It will be noted that this curve has substantially the same shape as the characteristic curve 70 of FIGURE 2. The voltage and current values are substantially different, however; the curve 70 of FIGURE 2 is the volt-ampere characteristic of one type of 5 milliampere peak germanium tunnel diode and the curve 80 of FIGURE 3b is for one type of 10 milliampere peak gallium arsenide tunnel diode, by way of example. In actual practice, both diodes may be germanium or gallium arsenide. The diode 50a, however, preferably has a peak current higher than the peak current of the diode 10a to provide hard drive for the tunnel diode 10b in the bistable circuit of the next stage. The bias source $-V_2$ volts and the resistor 52a are chosen to supply a substantially constant current of $I_1$ milliamperes to the junction at the cathode of tunnel diode 50a. The parallel branch comprising the inductor 54a and the diode 56a acts as a load on the tunnel diode 50a. The solid curve 82 of FIGURE 3b is the inverted characteristic of the conventional diode 56a. This load line 82 has only one point *j* of intersection with the characteristic 80 in a region of positive resistance. As may be seen in FIGURE 3b, all of the current $I_1$ flows into the tunnel diode 50a in the steady state condition and none (for practical purposes) flows through the conventional diode 56a since the diode 56a is biased below the knee of its operating characteristic. The voltage across the tunnel diode 50a and the conventional diode 56a, which may be a germanium diode, is approximately 0.1 volt in the steady state. (The cathode of the tunnel diode 50a is −0.1 volt relative to ground).

The voltage at the cathode of the tunnel diode 10b of the second stage is either −60 millivolts or −300 millivolts in the steady state, whereby the coupling diode 34b is essentially non-conducting. The coupling diodes 34a, 34b, and 34c thus prevent triggering of a monostable circuit by the tunnel diode of the following stage. In the dynamic operating state of the monostable circuit, that is to say, when the monostable circuit is triggered, the coupling diode 34b is biased into conduction. This diode 34b and the tunnel diode 10b of the next state then function as an additional load on the tunnel diode 50a and determine, in part, the dynamic operation of the monostable circuit. The exact loading effect of the diode 34b and the tunnel diode 10b does not admit of precise illustration in the drawing. However, the dashed curve 86 is an acceptable approximation of the dynamic loading conditions for the purpose of understanding the operation of the circuit. The curve 86 is derived by combining the volt-ampere characteristics of the diode 34b and the tunnel diode 10b, and inverting the combined characteristic. In any event, the monostable circuit operates substantially as follows when the circuit is triggered.

The monostable circuit may be triggered by increasing the current through the tunnel diode 50a to a value above the peak value of 10 milliamperes. Such triggering occurs in the shift register when the transistor 14a is switched from the full on condition to the off condition, causing a negative-going signal to appear at the collector electrode 20a. This negative signal is coupled by the capacitor 60a as a current pulse $\Delta I$ to the input of the monostable circuit. The current through the tunnel diode 50a then increases to the peak value (10 milliamperes) and switches rapidly through the negative resistance region to the operating point *k*. The voltage across the tunnel diode 50a then is about 0.75 volt and the conventional diode 56a in the inductive branch is forward biased. The difference between the current quantity $(I_1+\Delta I)$ and the current corresponding to the operating point *k* generally is available for switching the tunnel diode 10b in the next stage. The current through the tunnel diode 50a decreases, following the path *kl* of the characteristic 80, as the current through the inductor 54a increases. Once the current through the tunnel diode 50a decreases below a value corresponding to point *l*, the tunnel diode 50a switches rapidly back through the region of negative resistance along a substantially constant current line 88 to the point *m* on the operating characteristic, and then gradually increases to $I_1$ milliamperes as the inductor 54a gives up its energy.

It is important to note that the conventional diode 56a serves two important functions in the monostable circuit. First, it prevents shunting of the trigger input current through the inductor 54a until after the tunnel diode 50a is switched. This action is achieved because the diode 56a initially is biased in the high impedance condition. This is important inasmuch as the output voltage at the collector 20a of the transistor 14a may not fall abruptly when the transistor 14a turns off. If the turn-off time of the transistor is very slow, a portion of the input trigger current supplied to the monostable circuit would be diverted into the inductor 54a in the absence of the conventional diode 56a and would slow down the triggering of the tunnel diode 50a. Only a small change in voltage at the collector 14a is necessary to trigger the tunnel diode 50a in the presence of the conventional diode 56a. Second, the conventional diode 56a decreases the recovery time of the monostable circuit because the dynamic operating conditions are modified by the diode 56a in such a way that the voltage across the inductive branch at the beginning of the recovery portion of the cycle is greater in the presence of the diode. This factor permits a greater "on" time to recovery time ratio for the monostable circuit.

The operation of the shift register in response to input current pulses 28 applied at the input terminals 30 will now be described with reference to the timing diagram of FIGURE 4. As an aid to a better understanding of the circuit's operation, it may be well to point out at this time that the shift pulse 40 amplitude is adjusted, as previously described, to provide fast switching or reset of the tunnel diodes 10a, 10b and 10c and turn-off overdrive for the transistors 14a, 14b and 14c. The width or duration of the shift pulse 40 is selected to be as long as the turn-off time of the slowest transistor. Thus, the shift pulse 40 is effective to turn the slowest "on" transistor "off" before that transistor can again be turned on from the output of the preceding stage. This insures that the monostable circuit at the output of the slowest transistor always receives a trigger signal when that transistor turns off. Also, the fact that the shift pulse 40 is applied to all of the tunnel diodes 10a, 10b, 10c at this time prevents multiple triggering of these diodes in the event that a monostable circuit is triggered more than once as the collector voltage falls. The monostable circuits are each adjusted so that the pulse output of a triggered monostable circuit overlaps the trailing edge of the shift pulse 40 in point of time, whereby the shift pulse 40 terminates prior to the output pulse of the monostable circuit. This insures that the output pulse of a monostable circuit is still present and applied to the tunnel diode of the next stage after the shift pulse 40 is terminated.

Various lines or rows on the timing diagram of FIGURE 4 are designated by alphabetic letters corresponding to various points in the FIGURE 1 circuit, which are similarly lettered. Initially all of the stages of the register are reset and each of the tunnel diodes 10*a*, 10*b* and 10*c* is in the low voltage state. The voltages at points A, D and G then are approximately —60 millivolts corresponding to the operating point *e* of FIGURE 2. The voltages at points B, E and H at the collector electrodes 20*a*, 20*b* and 20*c* of the transistors 14*a*, 14*b* and 14*c*, respectively, are approximately $-V_{cc}$ volts, assuming negligible external loading. The voltages at points C, F and I are approximately —100 millivolts corresponding to the operating point *j* of FIGURE 3*b*.

A first input current pulse 28*a* is applied at the input terminals 30 at time $t_a$. This pulse 28*a* may correspond, for example, to a binary "1" bit. The input pulse 28*a* switches the tunnel diode 10*a* of the first stage to the high voltage state whereupon the transistor 14*a* is driven into saturation. A small signal is coupled through the capacitor 60*a* to the tunnel diode 50*a* when the transistor 14*a* turns on. This signal (line C) is of the wrong polarity to trigger the monostable circuit. A shift pulse 40*a* is applied at the shift terminals 42 at a time $t_b$ to reset all the tunnel diodes 10*a*, 10*b* and 10*c*. Only the tunnel diode 10*a* is reset at this time, however, because the other tunnel diodes 10*b* and 10*c* are already in the reset state. The voltages at points A, D and G rise slightly in a positive direction during the application of the shift pulse 40*a* because of current supplied by the shift pulse 40*a*. The voltages across the tunnel diodes 10*a*, 10*b* and 10*c* correspond to the voltage at the point *i* of FIGURE 2 while the shift pulse 40 is applied. The transistor 14*a* turns off when the tunnel diode 10*a* is switched to the reset state.

It may be seen from the waveform on line B that the collector 20*a* voltage does not fall immediately to $-V_{cc}$ volts when the shift pulse 40*a* is first applied, but rather remains high as the transistor 14*a* continues conducting until time $t_c$, due primarily to the storage time of the transistor 14*a* occasioned by saturation. The duration of the shift pulse 40*a* should be at least as long as the turn-off time of the transistor. The output voltage at the collector 20*a* (line B begins to fall towards $-V_{cc}$ volts at approximately time $t_c$. The negative-going signal coupled through the capacitor 60*a* triggers the tunnel diode 50*a* in the monostable circuit of the first stage, and the voltage at the cathode of the tunnel diode 50*a* falls to approximately —0.75 volt (point *k*, FIGURE 3). The shift pulse 40*a* terminates at $t_d$. Note, however, that the output pulse (line C) of the monostable circuit of the first stage overlaps the trailing edge of this shift pulse 40*a* and has a substantial amplitude at $t_d$. This output pulse is passed by the diode 34*b* and switches the tunnel diode 10*b* in the second stage at $t_d$. The voltage across the tunnel diode 10*b* then becomes approximately —300 millivolts (line D) and the transistor 20*b* in the second stage is turned on at this time (line E).

The next shift pulse 40*b* is applied at the shift terminals 42 at $t_e$ and resets the tunnel diode 10*b* in the second stage. The voltage (line D) at the cathode of this tunnel diode 10*b* changes from —300 millivolts to close to ground potential (point *i*, FIGURE 2) and turns the transistor 14*b* off (line E). Again, the output voltage of transistor 14*b* does not immediately fall to $-V_{cc}$ volts because of storage delay. The fall in the collector 20*b* voltage at $t_f$ triggers the monostable circuit of the second stage and a negative-going pulse (line F) is provided at the output of the second stage monostable circuit. This pulse is ineffective to switch the tunnel diode 10*c* of the third stage at this time because the shift pulse 40*b* is still present and overrides the pulse output of the monostable circuit. The shift pulse 40*b* terminates at $t_g$, whereupon the output of the monostable circuit of the second stage switches the tunnel diode 10*c* in the third stage to the set state (line G). The voltage at the cathode of the tunnel diode 10*c* falls to approximately —300 millivolts and the transistor 14*c* turns on (line H).

The next current input pulse 28*b* is applied at the input terminals 30 at $t_h$. This pulse switches the tunnel diode 10*a* in the first stage to the high voltage state and the transistor 14*a* turns on (line B). At this time, the tunnel diodes 10*a* and 10*c* are in the set state and the transistors 14*a* and 14*c* are in saturation. The next shift pulse 40*c* is applied at the shift terminals 42 at $t_i$ and resets the tunnel diodes 10*a* and 10*c* to the low voltage state (line A and G). The transistors 14*a* and 14*c* then are biased to cut-off, and the voltages at the collector electrodes 20*a* and 20*c* fall toward $-V_{cc}$ volts at $t_j$, after a storage delay. Note that the shift pulse 40*c* is still present at this time. The fall in voltages at the collector electrodes 20*a* and 20*a* triggers the tunnel diodes 50*a* and 50*c* in the first and third stages, respectively, to provide trigger output pulses which overlap the shift pulse 40*c* in point of time. The shift pulse 40*c* terminates at $t_k$ and the pulse output of the monostable circuit in the first stage then switches the tunnel diode 10*b* in the second stage to the high voltage or set state (line D). The transistor 14*b* then is driven into saturation (line E).

The contents of the shift register, as described previously, may be read out serially by sampling the output at the collector 20*c* of the third stage. Alternatively, the information stored in the register may be read out in parallel by sampling the voltages at the collector electrodes 20*a*, 20*b* and 20*c*. The register may be cleared in a number of ways. For example, a series of shift pulses may be applied at the terminals 42 with no information pulses 28 applied at the input terminals 30. The register also could be cleared by applying a positive pulse of long duration to the shift bus 44. By "long duration" is meant longer than the duration of the pulse output of the monostable circuits. Although the FIGURE 1 circuit has been illustrated and described as comprising PNP transistors, it will be understood that NPN transistors also may be used, provided that the connections to the various tunnel diodes and conventional diodes are reversed, the polarities of the input 28 and shift 40 pulses are reversed and the polarities of the various bias sources are reversed.

FIGURE 5 is a schematic diagram of another embodiment of a shift register according to the invention wherein the transistors of the bistable circuits are connected in the common base configuration. Only a two-stage register is shown. It will be understood, however, that the register may be expanded to any desired number of stages by cascading additional stages like stage #2. The last stage of the register need not include a monostable circuit portion unless it is desired to operate the register as a ring counter.

The first stage comprises a tunnel diode 100*a* having its cathode connected to ground and its anode connected to the emitter electrode 102*a* of a grounded base PNP transistor 104*a*. A source of bias potential, designated $+E_1$, and a resistor 106*a* supply a substantially constant current at the anode of the tunnel diode 100*a* for biasing the tunnel diode for bistable operation. The collector electrode 108*a* of the transistor 104*a* is reverse biased with respect to the base electrode 110*a* by connecting the collector electrode 108*a* to a source of bias potential $-V_{cc}$ by way of a resistor 112*a*. The parameters of the bistable circuit portion are selected so that the transistor 110*a* is substantially nonconducting when the tunnel diode 100*a* is in the stable state of low voltage. The voltage across the tunnel diode 100*a* in this condition may be approximately 60 millivolts, and the transistor 104*a* conducts very little, if at all, at this low value of forward emitter-base bias. The collector 108*a* potential then is highly negative, relatively speaking, the particular voltage depending upon the external load connected to the terminal designated "out" at the collector 108a. The transistor 104a conducts heavily when the tunnel diode 100a is in the stable state of high voltage (approximately 300 millivolts) and the voltage at the collector electrode 108a then is close to ground potential.

Positive input signals 120 may be applied across a pair of input terminals 122 for setting the tunnel diode 100a to the high voltage state. One of the input terminals 122 is grounded and the other of the input terminals 122 is connected to the anode of the tunnel diode 100a by way of a resistor 124a. The tunnel diodes 100a, 100b in the bistable circuit portions of all of the stages are reset to the low voltage state by negative shift pulses 124 applied at a pair of shift input terminals 126. The ungrounded one of the shift input terminals 126 is connected to a bus 128. The anodes of the tunnel diodes 100a, 100b are connected to the bus by resistors 130a, 130b, respectively.

The monostable circuit portion of the first stage comprises a second tunnel diode 134a having its anode connected to circuit ground. A source of negative bias potential $E_2$ and a resistor 136a supply a substantially constant current at the cathode of the tunnel diode 134a. The series combination of an inductor 134a and a conventional diode 140a, such as a germanium diode, is connected in parallel with the tunnel diode 134a. Voltage changes at the collector electrode 108a of the transistor 104a are coupled to the cathode of the tunnel diode 134a by a capacitor 142a. The common junction 144a of the tunnel diode 134a cathode, the resistor 136a and the inductor 138a may be considered the trigger input terminal of the monostable circuit. Operation of the monostable circuit is the same as the operation of the monostable circuits of the FIGURE 1 shift register described previously in connection with FIGURE 3.

The second stage of the register is structurally the same as the first stage except for the input arrangement. The input to the second stage includes a conventional diode 150 having its cathode connected to the common junction 144a. A capacitor 152 is connected between the anode of the conventional diode 150 and the anode of the tunnel diode 100b. A resistor 154 is connected between reference ground and the anode of the conventional diode 150, which may be, for example, a germanium diode or a tunnel rectifier. Additional stages which may be added in cascade to the register include the input arrangement described immediately above.

Consider now the operation of the FIGURE 5 register and assume that the tunnel diodes 100a and 100b initially are in the low voltage state. Both of the transistors 104a and 104b then are substantially nonconducting and the output voltages at the collector electrodes 108a, 108b are highly negative, relatively speaking. A positive information input pulse 120 applied at the input terminals 122 has a polarity and amplitude to switch the tunnel diode 100a to the high voltage state. The transistor 104a then is biased into heavy conduction, and the collector 108 potential rises in a positive direction toward ground. A positive signal is coupled by the capacitor 142a to the cathode of the tunnel diode 134a in the first stage monostable circuit. This signal, however, is of the wrong polarity to trigger the monostable circuit, and the tunnel diode 134a thus remains in the low voltage state. The first stage then stores a binary "1" and the second stage stores a binary "0."

The information stored in the register is shifted one position to the right, as viewed in the drawing, in response to a negative-going shift pulse 124. This shift pulse 124 has an amplitude and polarity to reset the tunnel diodes 100a and 100b. Only the tunnel diode 100a is switched to the low voltage state since the tunnel diode 100b already is in the low voltage state. The shift pulse 124 preferably has an amplitude sufficient to provide turn-off overdrive for the transistors 104a, 104b. The transistor 104a is biased to cut-off when the tunnel diode 100a is switched to the low voltage state and the voltage at the collector 108a falls from approximately ground potential toward $-V_{cc}$ volts, after a storage delay. A negative signal is coupled by the capacitor 142a to the junction point 144a and triggers the monostable circuit. The tunnel diode 134a is switched rapidly through the negative resistance region of its operating characteristic as described previously in connection with FIGURE 3 to provide a negative pulse 160 at the junc-144a. The conventional diode 150 is poled to pass this negative pulse 160, and a voltage having the waveform 162 is developed across the resistor 154. The signal 162 is differentiated by the capacitor 152 and the circuit resistance connected thereto, primarily the resistance of the tunnel diode 100b. A signal having the waveform 164 is applied to the anode of the tunnel diode 100b.

The shift pulse 124 is selected to have a duration greater than the turn-off time of the slowest transistor in the register, for reasons discussed previously. The parameters of the monostable circuits are selected so that the negative pulse 160 provided by a triggered monostable circuit overlaps the trailing edge of the shift pulse 124 in point of time. Consequently, the positive spike of the waveform 164 occurs after the termination of the shift pulse 124 and has a polarity and amplitude to switch the tunnel diode 100b to the stable state of high voltage. This positive spike preferably has an amplitude sufficient to provide turn-on overdrive for the transistor 104b. The conventional diode 150 prevents the shift pulse 124 at the anode of the tunnel diode 100b from being fed back to the monostable circuit of the first stage. Following the shift pulse 124, the tunnel diode 100a is in the low voltage state and the tunnel diode 100b is in the high voltage state. The transistor 104a is nonconducting and the transistor 104b is in heavy conduction, whereby the first and second stages store a binary "0" and a binary "1," respectively.

Assume that a second shift pulse 124 is applied to the register before a second input pulse 120. This shift pulse 124 switches the tunnel diode 100b in the second stage to the low voltage state and the transistor 104b turns off after a short delay. The monostable circuit in the second stage is triggered when the voltage at the collector 108b falls from approximately ground potential toward $-V_{cc}$ volts, and the tunnel diode 134b is switched through its negative resistance region to provide a negative-going output pulse 168. This pulse, as described previously, overlaps the trailing edge of the shift pulse 124 and is applied to the tunnel diode (not shown) of the next stage.

Information may be read into the shift register by serially applying the information bits as pulses 120 or no pulses, in timed sequence with the shift pulses 124, at the input terminals 122. Information may be read out serially at the collector electrode of the last stage of the register. Alternatively, the information may be read out in parallel by sampling the voltages at the individual collector electrodes 108a, 108b, etc. Information also may be read into the register in parallel by applying the information bits at the input terminals of the individual stages of like order. For example, an information bit may be read into the second stage from an external source by applying a positive input pulse at the terminal designated "in" at the anode of the tunnel diode 100b. This input terminal is connected to the anode of the tunnel diode 100b by a resistor 124b. The shift register may be cleared in the same way as the register of FIGURE 1.

It will be understood that the register of FIGURE 5 may be operated as a ring counter in the same manner as the FIGURE 1 register by applying the output of the monostable circuit in the last stage to the anode of the tunnel diode 100a in the first stage. Although the FIG- URE 5 register has been illustrated and described as employing PNP transistors, it will be understood that NPN transistors also may be employed. In the latter case, it is only necessary to reverse the connections to the various tunnel diodes and conventional diodes, and to reverse the polarities of the various bias sources, the input pulses 120 and the shift pulses 124.

Shift registers of the type illustrated and described have been successfully operated at approximately 150 megacycles. This high speed will be recognized as greatly exceeding the operating speed of known shift registers. By way of example, a shift register of the type illustrated in FIGURE 1 was operated successfully at 150 megacycles when the circuit components had the following approximate values:

| | |
|---|---|
| Resistor 32*a* | 1,000 ohms. |
| Resistor 12*a* | 1,000 ohms. |
| Voltage $V_1$ | 3 volts. |
| Tunnel diode 10*a* | 5 milliampere peak Ge. |
| Transistor 14*a* | 2N769. |
| Resistor 22*a* | 1,000 ohms. |
| Voltage $V_{cc}$ | 6–10 volts. |
| Capacitor 60*a* | 4.7 $\mu\mu$f. |
| Tunnel diode 50*a* | 10 milliampere peak GaAS. |
| Inductor 54*a* | 0.1 $\mu$h. |
| Diode 56*a* | S570G (Transitron). |
| Diode 34*b* | S570G (Transitron). |
| Resistor 52*a* | 2,200 ohms. |
| Voltage $V_2$ | 20 volts. |

These circuits values are illustrative only and constitute no limitation of the present invention.

What is claimed is:

1. The combination comprising: a transistor having at least an output electrode, a common electrode and an input electrode; a two-terminal, negative resistance diode connected between the input and common electrodes; means connected to said diode for biasing said diode for operation as a bistable element, the voltage at the output electrode of said transistor having either a first value or a second value corresponding to, and dependent upon, the first and second stable states, respectively, of said diode; means coupled to said diode for applying a control pulse to switch said diode to the first stable state; and a monostable circuit connected to said output electrode and being triggerable when the voltage at said output electrode changes from said second value toward said first value to provide a pulse which overlaps, in point of time, the lagging edge of said control pulse.

2. The combination comprising: a transistor having an input electrode, a common electrode and an output electrode; a two-terminal, negative resistance diode connected by negligible impedance means between the common and input electrodes; means connected to said diode for biasing said diode bistably, the voltage at the output electrode of said transistor having a first value when the diode is in a first stable state and having a second value when said diode is in a second stable state; means coupled to said diode for applying input pulses of a first polarity selectively to set said diode to the second stable state; means coupled to said diode for applying a reset pulse of a second polarity, opposite said first polarity to reset said diode to the first stable state; and a monostable circuit connected to said output electrode and being triggerable when the voltage at said output electrode changes from said second value toward said first value to provide a pulse of said first polarity which overlaps, in point of time, the lagging edge of said reset pulse.

3. The combination comprising: a transistor having an input electrode, a common electrode and an output electrode; a two-terminal, negative resistance diode connected between the input and common electrodes; means connected to said diode for biasing said diode for operation as a bistable element, the voltage at the output electrode of said transistor having a first value when the diode is in a first stable state and having a second value when said diode is in a second stable state; means coupled to said diode for applying input pulses selectively to said diode to set said diode to the second stable state; means coupled to said diode for applying a reset pulse to said diode to reset said diode to the first stable state; and a monostable circuit connected to said output electrode and being triggerable when the voltage at said output electrode changes from said second value toward said first value to provide a pulse which overlaps, in point of time, the lagging edge of said reset pulse, said monostable circuit including a second two-terminal, negative resistance diode and means for biasing said second diode for monostable operation.

4. The combination comprising a two-terminal, negative resistance diode; means for biasing said diode for bistable operation; a transistor having an input electrode connected to one electrode of said diode, an output electrode, and a common electrode connected to the other electrode of said diode, the voltage at said output electrode changing in a first polarity direction when said diode is switched from said second stable state to said first stable state; means coupled to said diode for selectively applying input pulses to said diode to set said diode to said second stable state; means coupled to said diode for periodically applying reset pulses to said diode to reset said diode to said first table state, each reset pulse having a duration greater than the transient switching time of said transistor; and a monostable circuit coupletd to said output electrode and being triggerable by a signal having said first polarity direction to provide a pulse which overlaps, in point of time, the lagging edge of said reset pulse.

5. The combination comprising a transistor having an input electrode, a common electrode and an output electrode; a first negative resistance diode connected between the input and common electrodes of said transistor; means connected across said first diode for biasing said first diode for bistable operation; means coupled to said first diode for applying switching pulses thereto; and a monostable circuit having a trigger input coupled to said output electrode, said monostable circuit including the series combination of an inductor and a unidirectional conducting device connected between said trigger input and said common electrode, a second negative resistance diode connected in parallel with said series combination, and substantially constant current means connected at said trigger input terminal for biasing said second diode monostably.

6. The combination comprising a transistor having an input electrode, a common electrode and an output electrode; a first negative resistance diode connected between the input and common electrodes; means connected to said first diode for biasing said first diode for bistable operation; pulse input means coupled to said first diode; and a monostable circuit having a trigger input coupled to said output electrode by way of a capacitor, said monostable circuit including the series combination of an inductor and a unidirectional conducting device connected between said trigger input and said common electrode, a second negative resistance diode connected in parallel with said series combination, and means for connecting a substantially constant current to said trigger input terminal for biasing said second diode for monostable operation.

7. The combination comprising a transistor having an input electrode, a common electrode and an output electrode; a first tunnel diode connected between said common electrode and said input electrode; means connected to said first tunnel diode for biasing said first tunnel diode for bistable operation, the voltage at the output electrode of said transistor having a first value when said first tunnel diode is in a first stable state and having a second value when said first tunnel diode is in a second stable state; means coupled to said first tunnel diode for selectively applying input pulses to said first tunnel diode to set said first tunnel diode to the second stable state; means coupled to said first tunnel diode for periodically applying a reset pulse to said first tunnel diode to reset the first tunnel diode to the first stable state; and a monostable circuit having a trigger input terminal coupled to said output electrode and being triggerable when the voltage at said output electrode changes from said second value toward said first value to provide an output pulse which overlaps, in point of time, the lagging edge of said reset pulse, said monostable circuit including the series combination of an inductor and a unidirectional conducting device connected between said trigger input terminal and said common electrode, a second tunnel diode connected in parallel with said series combination, and means connected to said second tunnel diode for biasing said second tunnel diode for monostable operation.

8. A shift circuit comprising a plurality of cascaded stages, each of said stages including: a transistor having an input electrode, a common electrode and an output electrode; a negative resistance diode connected between the input and common electrodes; means connected to said diode for biasing said diode for bistable operation, the voltage at the output electrode of said transistor having a first value when said diode is in a first stable state and having a second value when said diode is in a second stable state; means coupled to apply a reset pulse of a first polarity to said diode for resetting said diode to the first stable state; and a monostable circuit connected to said output electrode and triggerable when the voltage at said output electrode changes from said second value to said first value to provide an output pulse of a second polarity opposite said first polarity, which output pulse overlaps the lagging edge of said reset pulse in point of time; and means connecting said stages in cascade, said latter means including separate means each coupling the output of a different said monostable circuit to the said input electrode of a different said transistor.

9. A shift circuit comprising: a plurality of stages connected in cascade, each stage including a negative resistance diode, means connected to said diode for biasing said diode for bistable operation, a transistor having an input electrode connected to one electrode of said diode, a common electrode connected to the other terminal of said diode, and an output electrode, the voltage at said output electrode having a first value and a second value corresponding, respectively, to the first and second stable states of said diode, means coupled to said diode for applying a shift pulse having a polarity to switch said diode to the first stable state and a duration greater than the turn-off time of the slowest said transistor, a monostable circuit connected to said output electrode and being triggerable when the voltage at said output electrode changes from said second value toward said first value to provide an output pulse which overlaps, in point of time, the lagging edge of the reset pulse, and unidirectional conducting means connecting the output of each monostable circuit to the said one electrode of said diode in a different other one of said stages, each said unidirectional means being connected in a direction to pass the output pulse of the associated monostable circuit.

10. A shift circuit comprising: a plurality of stages connected in cascade, each stage including a tunnel diode, means connected to said tunnel diode for biasing said tunnel diode for bistable operation, a transistor having an input electrode connected to one electrode of said tunnel diode, a common electrode connected to the other electrode of said tunnel diode, and an output electrode, the voltage at said output electrode having a first value and a second value corresponding, respectively, to the set and reset states of said tunnel diode, means coupled to said tunnel diode for applying a shift pulse having a polarity to switch said tunnel diode to the first stable state and a duration greater than the turn-off time of the slowest said transistor, a monostable circuit connected to said output electrode and being triggerable when the voltage at said output electrode changes from said second value toward said first value to provide an output pulse which overlaps, in point of time, the lagging edge of the reset pulse, and unidirectional conducting means connecting the output of each monostable circuit to the said one electrode of said tunnel diode in a different other one of said stages.

11. A shift circuit comprising a number of cascaded stages, each of said stages including: a transistor having an input electrode, a common electrode and an output electrode; a first tunnel diode connected between said common electrode and said input electrode; means connected to said first tunnel diode for biasing said first tunnel diode for bistable operation, whereby said first tunnel diode has a stable set state and a stable reset state, the voltage at said output electrode having a first value when said first tunnel diode is in the reset state and having a second value when said first tunnel diode is in the set state; means coupled to said first tunnel diode for switching said first tunnel diode to a desired stable state, and a monostable circuit having a trigger input terminal connected to said output electrode and being triggerable when the voltage at said output electrode changes from said second value toward said first value, said monostable circuit including the series combination of an inductor and a unidirectional conducting device connected between said trigger input terminal and said common electrode, a second tunnel diode connected in parallel with said series combination; and means connected to said second tunnel diode for biasing said second tunnel diode for monostable operation.

12. A shift circuit comprising a number of cascaded stages, each of said stages including: a transistor having an input electrode, a common electrode and an output electrode; a first tunnel diode connected between said common electrode and said input electrode; means connected to said first tunnel diode for biasing said first tunnel diode for bistable operation, the voltage at said output electrode having a first value when said first tunnel diode is in a first stable state and having a second value when said first tunnel diode is in the second stable state; means coupled to said first tunnel diode for switching said first tunnel diode to a desired stable state, and a monostable circuit having a trigger input terminal connected to said output electrode and being triggerable when the voltage at said output electrode changes from said second value toward said first value, said monostable circuit including the series combination of an inductor and a unidirectional conducting device connected between said trigger input terminal and said common electrode, a second tunnel diode connected in parallel with said series combination; and substantially constant current means connected to said trigger input terminal for biasing said second tunnel diode for monostable operation.

13. A shift circuit comprising a number of cascaded stages, each of said stages including: a transistor having an input electrode, a common electrode and an output electrode; a first tunnel diode having one electrode connected to said input electrode and another electrode connected to said common electrode; means connected to said first tunnel diode for biasing said first tunnel diode for bistable operation, the voltage at said output electrode having a first value when said first tunnel diode is in a first stable state and having a second value when said first tunnel diode is in the second stable state; means coupled to said first tunnel diode for applying pulses of one polarity for switching said first tunnel diode to said second stable state, and a monostable circuit having a trigger input terminal connected to said output electrode and being triggerable when the voltage at said output electrode changes from said second value toward said first value, said monostable circuit including the series combination of an inductor and a unidirectional conducting device connected between said trigger input terminal and said common electrode, a second tunnel diode connected in parallel with said series combination, and means connected to said second tunnel diode for biasing said second tunnel diode for monostable operation; and means coupled to each said first tunnel diode for periodically applying a shift pulse of a polarity opposite said one polarity for resetting each said first tunnel diode to the first stable state, the shift pulse having a duration greater than the turn-off of the slowest said transistor in the shift circuit, and each monostable circuit, when triggered, providing an output pulse of said one polarity which overlaps, in point of time, the lagging edge of the applied shift pulse.

14. A shift circuit comprising a number of cascaded stages, each of said stages including: a transistor having an input electrode, a common electrode and an output electrode; a first tunnel diode connected between said common electrode and said input electrode; means connected to said first tunnel diode for biasing said first tunnel diode for bistable operation, the voltage at said output electrode having a first value when said first tunnel diode is in a first stable "reset" state and having a second value when said first tunnel diode is in the second stable "set" state; means coupled to said first tunnel diode for switching said first tunnel diode to a desired stable state, and a monostable circuit having a trigger input terminal connected to said output electrode and triggerable when the voltage at said output electrode changes from said second value toward said first value, said monostable circuit including the series combination of an inductor and a unidirectional conducting device connected between said trigger input terminal and said common electrode, a second tunnel diode connected in parallel with said series combination; and means connected to said second tunnel diode for biasing said second tunnel diode for monostable operation; means coupled to each said first tunnel diode for periodically applying a shift pulse of a first polarity for resetting each said first tunnel diode to the first stable state, the shift pulse having a duration greater than the turn-off time of the slowest said transistor in said shift circuit, and each monostable circuit, when triggered, providing an output pulse of a polarity opposite said first polarity which overlaps, in point of time, the lagging edge of the applied shift pulse; and separate unidirectional conducting devices each connected between the output of a different said monostable circuit and the said one electrode of a different said first tunnel diode for connecting said stages in cascade, each said unidirectional conducting device being connected to be forward biased by the output pulse of the associated monostable circuit.

15. A shift circuit comprising a number of cascaded stages, each of said stages including: a transistor having a base electrode, an emitter electrode and a collector electrode, and being connected in the common base configuration; a first tunnel diode connected between said base electrode and said emitter electrode; means connected to said first tunnel diode for biasing said first tunnel diode for bistable operation, the voltage at said collector electrode having a first value when said first tunnel diode is in a first stable "reset" state and having a second value when said first tunnel diode is in the second stable "set" state; means coupled to said first tunnel diode for selectively applying thereto a pulse of one polarity for switching the diode to the set state, and a monostable circuit having a trigger input terminal connected to said collector electrode and being triggerable when the voltage at said collector electrode changes from said second value toward said first value, said monostable circuit including the series combination of an inductor and a unidirectional conducting device connected between said trigger input terminal and said base electrode, a second tunnel diode connected in parallel with said series combination; and means connected to said second tunnel diode for biasing said second tunnel diode for monostable operation; means coupled to each said first tunnel diode for periodically applying a shift pulse of the opposite polarity for resetting each said first tunnel diode to the first stable state, the shift pulse having a duration greater than the turn-off time of the slowest said transistor in said shift circuit, and each monostable circuit, when triggered, providing an output pulse which overlaps, in point of time, the lagging edge of the applied shift pulse; separate unidirectional conducting devices each connected between the output of a different said monostable circuit and the said emitter electrode of a different said first tunnel diode for connecting said stages in cascade; a separate capacitor connected between each of the last-mentioned unidirectional conducting devices and the said emitter electrode of the said first tunnel diode of the next stage; and a separate resistor connecting the capacitor side of each of the last-mentioned unidirectional conducting devices to said base electrode.

References Cited in the file of this patent

UNITED STATES PATENTS

| | | |
|---|---|---|
| 3,016,469 | Barrett | Jan. 9, 1962 |
| 3,016,470 | Van Dine | Jan. 9, 1962 |
| 3,021,517 | Kaenel | Feb. 13, 1962 |

OTHER REFERENCES

"The Tunnel Diode Circuit Design Handbook," by Transitron Electronic Corp., AN-1359A-3-61, dated March 1961, FIG. 7, page 4 relied on.

"Hughes Tunnel Diodes," by Hughes Semi-Conductor Division (Advance Data) in Tentative Bulletin DS-83A-JM-9/60, September 1960).

"RC Coupled Tunnel Diode Shift Register," in IBM Technical Disclosure Bulletin (vol. 2, No. 6, April 1960).